April 7, 1942.    W. C. OSTERHOLM    2,278,556
FRICTION CLUTCH
Filed June 28, 1938

INVENTOR
WILLIAM C. OSTERHOLM
By Wilkinson, Huxley, Byron & Knight
attys.

Patented Apr. 7, 1942

2,278,556

UNITED STATES PATENT OFFICE 2,278,556

FRICTION CLUTCH

William C. Osterholm, Oak Park, Ill.

Application June 28, 1938, Serial No. 216,267

6 Claims. (Cl. 192—76)

My invention relates to a friction clutch and consists in a modification of well-known driving and driven elements.

It is an object of this invention to construct a friction clutch device requiring a small space and which will be economical to manufacture.

Another object of my invention is to construct a friction clutch device wherein all the wearing parts are definitely and permanently lubricated.

Another object of this invention is to construct a friction clutch device having a very small overall outside diameter which will deliver maximum torque without over stressing the mechanical working parts thereof.

Another object of this invention is to construct a friction clutch device which will operate at very high speeds and maintain perfect balance.

With these and other objects in view, which will appear as the description proceeds, my invention consists in the construction and arrangement of parts hereinafter described and claimed.

In the accompanying drawing which forms a part of this specification, I have illustrated a convenient and practical embodiment of my invention, and in which:

Referring now to the accompanying drawing—

Figure 1:
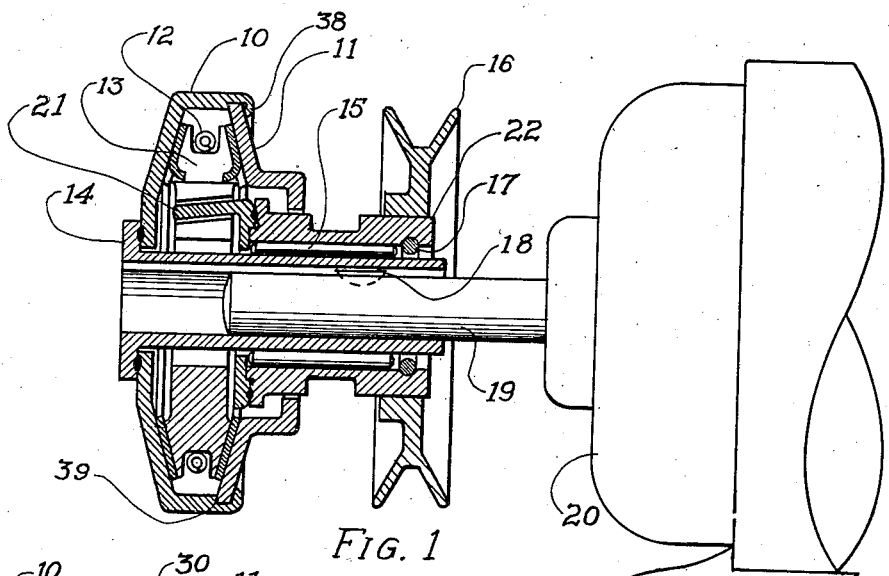
Fig. 1 shows my clutch assembled and mounted upon the rotor shaft of a prime mover which as shown is an electric motor.
Figure 2:
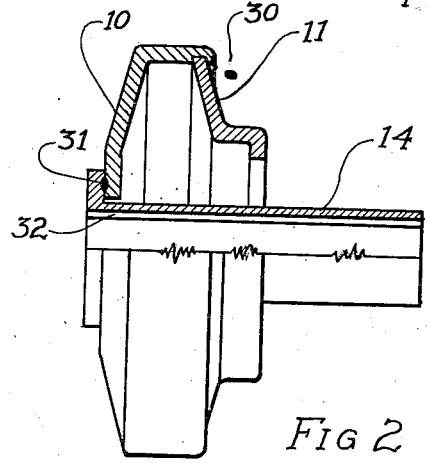
Fig. 2 shows the case and hub of the driving member.
Figure 3:
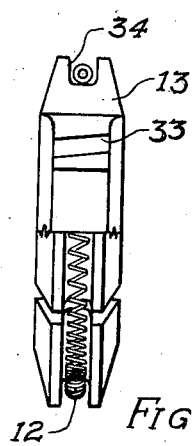
Fig. 3 shows the expanding friction shoes which constitute a part of the driving member.
Figure 4:
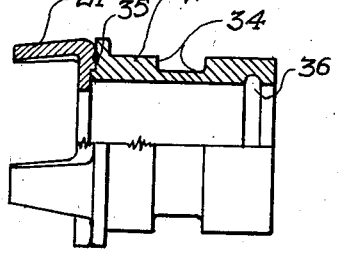
Fig. 4 shows the expander for operating the friction shoes and the collar co-operating with an operating yoke (not shown).
Figure 5:
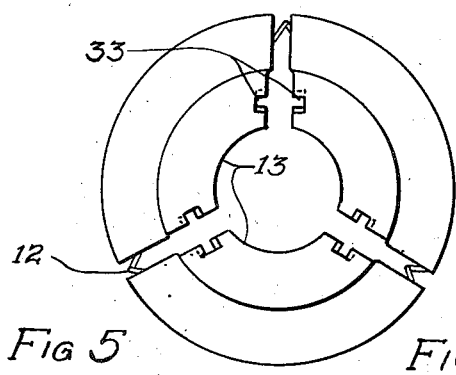

Fig. 5 shoes a plan view of part of the driven member.

Figure 6:

Fig. 6 shows the expanding friction shoes provided with wear-resisting facing material.

Referring to the different figures of the drawing, 10 and 11 are the two sides of the casing forming tapered interior walls and part of the driven member. 12 is a choke spring acting as a contracting element upon shoes 13. The hub member 14 suports the entire clutch assembly and is welded or otherwise fastened to part 10 as shown at 31. The needle bearings 15 provide a frictionless bearing for the slidable sleeve 22. The power take-off may be a grooved pulley 16 or any other well-known element such as a sprocket (not shown). The retaining ring 17 is snapped into groove 36 formed on the interior wall of the operating sleeve 22 and acts to retain the needle bearings 15 in operating position. The key 18 maintains the hub 14 in driving position with the prime mover shaft 19. The electric motor 20 is the prime mover, although it is to be understood that any other prime mover may be used. The expander fingers 21 are preferably formed from sheet metal and have tapered sides engaging the grooves 33. One or more expander fingers 21 may be used and are preferably formed in one stamping which may be welded or otherwise secured to the operating sleeve 22 which may be formed with a groove 34 to co-operate with any suitable operating yoke (not shown). The shoes 13 may be die castings or any other suitable metal and may be provided with facing 37 made from any suitable wear-resisting material.

In engaging and disengaging my clutch, any suitable yoke (not shown) co-operating with the groove 34 is moved towards the casings 10 and 11, which causes the sleeve 22 to move towards the casings 10 and 11, the expander fingers 21 then engage grooves 33, causing the shoes 13 to engage the tapered faces formed on the casings 10 and 11. The fingers 21 moving towards the cases 10 and 11 engage the bottom of the grooves 33 formed in shoes 13, causing the shoes 13 to expand outwardly and engage the tapered walls of the casings 10 and 11. The friction engagement of the shoes grips the interior walls of the casings, causing the entire assembly to rotate and drive the pulley 16. When it is desired to disengage my clutch, the operating sleeve 22 is moved in a direction away from the casings 10 and 11, causing the fingers 21 to move the shoes 13 out of engagement with the tapered interior walls formed on members 10 and 11. This disengagement is further assisted by the choke spring 12 operating to contract the shoes 13.

When my clutch is assembled, it is partially filled with any suitable lubricant which is sealed within the interior of the clutch by a spinning or crimping operation, which permanently locks and secures the members 10 and 11 together as shown at 38. The housing wall 11 further closely embraces the sleeve 22 to substantially seal the interior of the housing, the space provided between said members being provided for normal operation of the clutch.

The casing 10 preferably will have a shoulder 39 providing an abutment for the casing 11, which will accurately space the casings 10 and 11 providing a V-shaped cavity co-operating with the shoes 13, and when the edge 38 on the casing 10 is formed over the edge of the casing 11 a permanent joint and seal is thereby provided.

When my clutch is in operation the rotation of the clutch will throw the lubricant within the clutch casing outwardly by centrifugal force thereby lubricating the wearing faces of the shoes 13.

Due to the fact that the parts are circular or always retained in a circular position, my clutch will operate at very high speeds and yet maintain perfect balance.

The driving member of my clutch as shown in the accompanying drawing and as above described includes a prime mover shaft 19, the casings 10 and 11 assembled together, which are fastened to the hub 14, and the driven member includes the shoes 13 and choke spring 12 and the engaging fingers 21 and the slidably operated sleeve and collar 22.

It is understood, however, that many modifications of the above description and the attached drawing will be apparent to those skilled in the art, and I do not wish to be limited to the exact construction above described.

What I claim is:

1. In a clutch mechanism, the combination of a lubricant retaining housing having axially spaced walls, one of said walls having an axially disposed opening, driving and driven means, a driving connection between one of said means extending axially through said opening and being connected to and terminating at the opposed wall of said housing whereby a complete fluid-tight axial closure is provided for said housing on one side thereof, a radially expansible friction clutch mechanism disposed within said housing and frictionally cooperating therewith, a driving connection mounted on said first-named connection extending through said opening between said first-named connection and closely embraced by said one of said walls, said last-named driving connection being operatively connected to said clutch mechanism and the other of said means, said last-named connection being movably mounted with respect to said first-named connection for operating said clutch mechanism into and out of its frictional cooperative relation with said housing, and anti-friction bearings between said first and second-named connections providing the said mounting for said second-named connection.

2. In a clutch mechanism, the combination of a housing, an expansible clutch mechanism disposed within and adapted to cooperate with said housing, driving and driven means, said clutch mechanism being of multi-part construction including radially movable clutch elements, said clutch elements having inclined grooves disposed in their marginal radially disposed edges, connecting means between one of said first-named means and said housing, and connecting means between the other of said first-named means and said clutch comprising an axially movable clutch operating member provided with inclined clutch fingers each in cooperative relation with opposed grooves of adjacent clutch elements for operating said clutch mechanism.

3. In a clutch mechanism, the combination of a housing, an expansible clutch mechanism disposed within and adapted to cooperate with said housing, driving and driven means, said clutch mechanism being of annular multi-part construction including radially movable clutch elements, means for yieldably holding said elements in associated relation, said clutch elements having inclined grooves disposed in their marginal radially disposed edges, connecting means between one of said first-named means and said housing, and connecting means between the other of said first-named means and said clutch comprising an axially movable clutch operating member provided with inclined clutch fingers each in cooperative relation with opposed grooves of adjacent clutch elements for operating said clutch mechanism.

4. In a clutch mechanism, the combination of a housing having axially opposed walls, one of said walls being provided with an opening, an axially disposed operating member connected to the other of said walls and extending through said opening, an expansible clutch mechanism disposed within and adapted to cooperate with said housing, said clutch mechanism being of annular multi-part construction embracing said operating member and including radially movable clutch elements, peripherally disposed means for yieldably holding said elements in associated relation, driving and driven means, one of said means being connected to said housing through said operating member, and connecting means between the other of said first-named means and said clutch comprising an axially movable clutch operating member provided with clutch fingers each of which has wedging cooperative engagement with the marginal edges of adjacent clutch elements.

5. In a clutch mechanism, the combination of a housing having axially opposed walls, one of said walls being provided with an opening, an axially disposed operating member connected to the other of said walls and extending through said opening, an expansible clutch mechanism disposed within and adapted to cooperate with said housing, said clutch mechanism being of annular multi-part construction embracing said operating member and including radially movable clutch elements, peripherally disposed means for yieldably holding said elements in associated relation, driving and driven means, one of said means being connected to said housing through said operating member, said clutch elements having inclined grooves disposed in their marginal radially disposed edges, connecting means between one of said first-named means and said housing, and connecting means between the other of said first-named means and said clutch comprising an axially movable clutch operating member provided with inclined clutch fingers each in cooperative relation with opposed grooves of adjacent clutch elements for operating said clutch mechanism.

6. In a clutch mechanism, the combination of a housing having axially opposed outwardly converging walls, one of said walls being provided with an opening, an axially disposed operating member connected to the other of said walls and extending through said opening, an expansible clutch mechanism disposed within and adapted to cooperate with said housing, said clutch mechanism being of annular multi-part construction embracing said operating member and including radially movable clutch elements having wedge surfaces cooperating with said converging walls, peripherally disposed means for yieldably holding said elements in associated relation, driving and driven means, one of said means being connected to said housing through said operating member, and connecting means between the other of said means and said clutch comprising a clutch operating member embracing said first-named operating member and being movable axially with respect thereto, said clutch elements having inclined grooves disposed in their marginal radially disposed edges, said clutch operating member being provided with inclined clutch fingers each in cooperative relation with opposed grooves of adjacent clutch elements for operating said clutch mechanism.

WILLIAM C. OSTERHOLM.